United States Patent [19]

Kudo et al.

[11] 4,242,421
[45] Dec. 30, 1980

[54] ELECTRODE CATALYST

[75] Inventors: Tetsuichi Kudo; Hidehito Obayashi, both of Tokyo, Japan

[73] Assignee: Hitachi, Ltd., Japan

[21] Appl. No.: 49,874

[22] Filed: Jun. 19, 1979

[30] Foreign Application Priority Data

Jun. 19, 1978 [JP] Japan ................................... 53-73201

[51] Int. Cl.³ .............................................. H01M 8/08
[52] U.S. Cl. ........................................ 429/13; 429/44; 429/46
[58] Field of Search .................... 429/44, 40, 46, 42, 429/13, 27; 252/432

[56] References Cited

U.S. PATENT DOCUMENTS

| 3,183,124 | 5/1965 | Jasinski | 429/40 X |
| 3,492,164 | 1/1970 | Wolfe, Jr. | 429/44 X |
| 3,607,410 | 9/1971 | Berger | 429/40 X |
| 3,796,671 | 3/1974 | Gleim | 252/432 |
| 3,859,181 | 1/1975 | Meibuhr | 429/44 X |
| 4,001,039 | 1/1977 | Elmore et al. | 429/46 |

Primary Examiner—Anthony Skapars
Attorney, Agent, or Firm—Craig & Antonelli

[57] ABSTRACT

An electrode catalyst for a fuel cell comprising at least one boride of molybdenum is disclosed. The electrode catalyst is far more excellent than conventional catalysts such as platinum black in that the resistance to acids is very high, that the polarization is little, that the price is low, etc. It is particularly suitable as an electrode catalyst for a fuel cell employing an acidic electrolyte.

10 Claims, 4 Drawing Figures

ELECTRODE CATALYST

FIELD OF THE INVENTION

This invention relates to an electrode catalyst for a fuel cell. More particularly, it relates to an electrode catalyst which is especially suitable for a fuel cell using an acidic electrolyte, an electrode containing said catalyst and a fuel cell employing said catalyst.

DESCRIPTION OF THE PRIOR ART

A fuel cell employing an acidic solution an an electrolyte (in this specification, such a fuel cell shall be described as an "acidic electrolyte type fuel cell") is free from the possibility of the degeneration of the electrolyte because neither carbonic acid gas produced by an electromotive reaction nor carbonic acid gas contained in the air is absorbed by the electrolyte. This is a remarkable feature over a fuel cell employing an alkaline electrolyte. On the other hand, however, an excellent electrode catalyst is not available, which is a serious problem.

An electrode catalyst for the acidic electrolyte type fuel cell needs to have, not only a high catalytic activity, but also a sufficiently high acid resistance. Therefore, usable materials are inevitably limited under such extreme conditions.

Heretofore, the previous metals of platinum, palladium, etc. have been usually employed as the electrode catalysts for the acidic electrolyte type fuel cells. However, they have the disadvantages that they are expensive and that the catalytic activities in the cases of using methanol, etc. as fuels are unsatisfactory.

As substitutes for the precious metals, there have recently been proposed electrode catalysts in which acid-proof compounds such as tungsten carbide (WC) [H. Böhm, F. A. Paul, Wissenschaft. Ber. AEG Telefunken, 41 (1968), 46] and cobalt phosphide ($CoP_3$) [G. Luft et al, Siemens Forsch. u. Entwickl. -Ger. Bd. 3 (1974) Nr. 3, 177] are used in an aqueous solution of sulfuric acid or phosphoric acid.

These electrode catalysts can achieve comparatively favorable results when employed as hydrogen electrode catalysts. However, they exhibit very low catalytic activities in the cases of using methanol, etc. as fuel, and they are difficult to place into practical use.

SUMMARY OF THE INVENTION

An object of this invention is to solve the problems of the prior art and to provide an electrode catalyst for an acidic electrolyte-type fuel cell which is inexpensive and which has excellent characteristics.

In order to accomplish the object, this invention uses borides of molybdenum is an electrode catalyst.

DETAILED DESCRIPTION

Unlike the various catalysts in the prior art, electrode catalysts which are made of borides of molybdenum present extraordinarily remarkable catalytic activities as electrode catalysts for electrolytic oxidation of various fuels, i.e. hydrogen, methanol, formalin, formic acid, etc. in acidic aqueous solutions.

In particular, the activities of the molybdenum borides for the electrolytic oxidation of methanol:

$$CH_3OH + H_2O \rightarrow CO_2 + 6H^+ + 6e^-$$

are much higher than the precious metals such as platinum, etc. When platinum is employed as the electrode catalyst for the electrolytic oxidation of methanol, the catalyst is poisoned by intermediate products such as HCHO and CO, and hence, the polarization increases. In contrast, the electrode catalysts made of the molybdenum borides according to this invention scarcely undergo such poisoning, so that the open circuit voltages exhibit values close to the theoretical voltage (0.04 V, versus a potential of the reference hydrogen electrode) of the electrolytic oxidation of methanol. Even when current is taken out, the increase of the polarization is very little.

As the borides of molybdenum, $Mo_2B$, $\alpha$-MoB, $\beta$-MoB, $MoB_2$, and $Mo_2B_5$ are commonly known at present. In this invention, one of these molybdenum borides or a mixture consisting of two or more of them can be used, and a very favorable result is obtained in any case. Even when $Mo_3B_2$ or $MoB_4$ is mixed with the aforementioned compounds, favorable results can be similarly obtained.

The borides of molybdenum presently known are the seven compounds mentioned above. It is contemplated that other compounds which are generally expressed as $MoB_x$ will also present catalytic activities to the electrolytic oxidation reactions of the fuels.

Regarding the borides of molybdenum, the acid resistance increases as the ratio of the boron content to the molybdenum content becomes large. Especially, $MoB_2$ and $Mo_2B_5$ are not dissolved even when boiled in sulfuric acid or phosphoric acid at a concentration of 6 molar; and they are particularly suitable as the electrode catalysts for the fuel cells employing acidic electrolytes.

When the ratio of the boron content to the molybdenum content is small, the acid resistance lowers. However, even when $Mo_2B$ or MoB whose boron content is the least was put in sulfuric acid or phosphoric acid at a concentration of 1 molar and was let stand at the normal temperature for 100 hours, no dissolution was noted, and it has been recognized that the molybdenum boride can be used without hindrance as the electrode catalyst for the acidic electrolyte type fuel cell.

EXAMPLE 1

Figure 1:
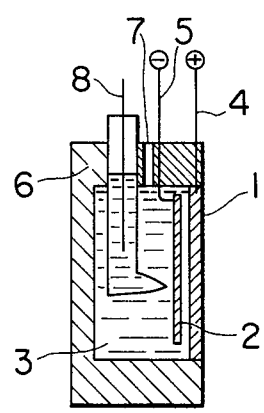
FIGS. 1 and 4 are schematic views, respectively, showing the sectional structures of fuel cells of different constructions.

FIG. 1 shows an embodiment of a structure in an elevational section of a methanol-air fuel cell. In FIG. 1, an air electrode 1 is an electrode which is usually called the Teflon (trademark, polytetrafluoroethylene) bonded electrode. It was formed in such a way that a mixture of active carbon and graphite were made into a paste-like substance with a small quantity of a polytetrafluoroethylene dispersion and applied to a wire net of tantalum. At this electrode oxygen is consumed according to $O_2 + 4H + 4e = H_2O$; i.e., current of one ampare is equivalent to $0.5 \times 10^{-5}$ mol $O_2/s$. The amount of air supplied was 100th times excess to theoretically required value. A fuel electrode 2 was formed as follows. Powder of $Mo_2B_5$ commercially available was washed well with a hot aqueous solution of phosphoric acid at a 3 molar concentration to dissolve and remove impurities. When the powder obtained was examined by the X-ray diffraction, only the diffraction spectrum of $Mo_2B_5$ was noted. 10 grams of active carbon was added to 1 gram of this $Mo_2B_5$ powder, and the carbon and powder were mixed well. The mixture was molded after adding a small quantity of pitch thereto. The molded compact was heat-treated and sintered, to form a porous carbon plate in which $Mo_2B_5$ was carried and which was about 2 mm thick. This plate was used as the fuel electrode. In this embodiment, the electrode was formed by mixing the powder of the boride of molybdenum with another material in advance and molding the mixture as described above. The fuel electrode in this invention, however, can be formed by various methods other than the foregoing. By way of example, it is possible that a porous molded compact of active carbon or the like is formed in advance and that the boride of molybdenum is placed in the porous molded compact by the chemical vapor deposition. The porous molded compact may well be immersed in a solution containing molybdenum and boron and then dried and heat-treated. With this measure, the boride of molybdenum is caused to be as a thin layer or film on the walls of the pores of the porous molded compact. Therefore, the required amounts of molybdenum and boron may be much smaller than in the method in the present example.

A phosphoric acid electrolyte 3 is an aqueous solution of phosphoric acid which is dissolved in methanol which is used as a fuel. Both the concentrations of methanol and phosphoric acid are 2 mol/l. The air electrode 1 and the fuel electrode 2 are electrically connected to terminals 4 and 5, respectively. The phosphoric acid electrolyte 3 is received in a cell container 6 made of an acrylic resin. Further, a gas exhaust port 7 which serves also as an electrolyte injection port is provided. The single-electrode potential of the fuel electrode 2 can be evaluated by means of a reference hydrogen electrode 8 which is immersed in the common electrolyte 3.

Figure 2:
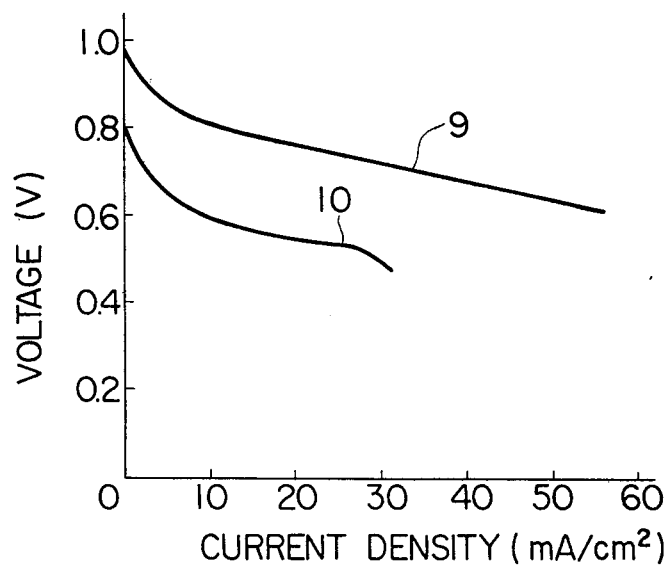
FIGS. 2 and 3 are graphs for illustrating the effects of this invention.

The relationship of the fuel cell having such a structure between the voltage and the current density at 50° C. is illustrated in FIG. 2.

In FIG. 2, curve 9 indicates the relationship obtained in case of employing the fuel electrode which contained the electrode catalyst according to this invention and which was formed by the method described above. A curve 10 indicates the relationship obtained when platinum black was used instead of $Mo_2B_5$ as the electrode catalyst and the other conditions were made the same.

Figure 3:
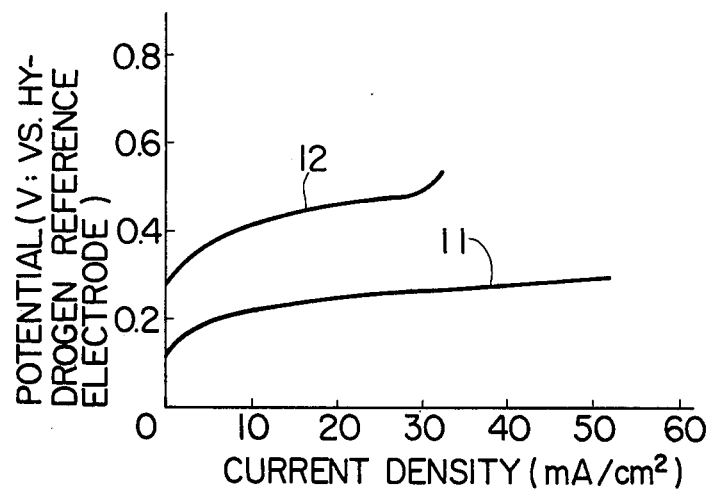

It is understood from the two curves 9 and 10 that when $Mo_2B_5$ is employed as the electrode catalyst, a far more excellent result is obtained than in the case of the prior art using platinum black. In order to make it more definite that the difference is based on the different fuel electrodes, the relationships of both the fuel electrodes between the single-electrode potential and the current density were investigated. Then, the results indicated in FIG. 3 were obtained. In this figure, curve 11 illustrates a characteristic at 50° C. of the electrode employing $Mo_2B_5$ as the catalyst. It is nobler by only about 0.07 V than the theoretical potential of the following reaction in the open-circuit state:

$$CH_3OH + H_2O \rightarrow CO_2 + 6H^+ + 6e^-$$

On the other hand, in the case of employing platinum black as the catalyst, the open-circuit voltage is nobler as much as 0.25 V with respect to the theoretical value as seen from a curve 12. Obviously, this is the most important cause for lowering the operating voltage of the fuel cell in the case of employing platinum black as the catalyst.

EXAMPLE 2

By the same method as in Example 1, there were fabricated methanol-air fuel cells respectively provided with three sorts of fuel electrodes whose catalysts were $MoB_2$, a mixture consisting of $MoB_2$ and $Mo_2B_5$ (at a weight ratio of 1:1), and a mixture consisting of $\alpha$-MoB and $Mo_2B_5$ (at a weight ratio of 1:2). The current density-voltage characteristics of the fuel cells at 50° C. were measured, and were compared with that in the case of employing platinum as the catalyst. Then results indicated in Table 1 were obtained.

As apparent from Table 1, terminal voltages at 20 $mA/cm^2$ in all the cases of employing the borides of molybdenum as the electrode catalysts were higher than in the case of using platinum.

TABLE 1

| Catalyst | Weight ratio of Active carbon carrier to Catalyst component | Terminal voltage (V) at 20 $mA/cm^2$ |
|---|---|---|
| $MoB_2$ | 10:1 | 0.78 |
| $MoB_2$ + $Mo_2B_5$ (weight ratio of 1:1) | 12:1 | 0.76 |
| $\alpha$-MoB + $Mo_2B_5$ (weight ratio of 1:2) | 10:1 | 0.75 |
| platinum | 10:1 | 0.55 |

EXAMPLE 3

Figure 4:
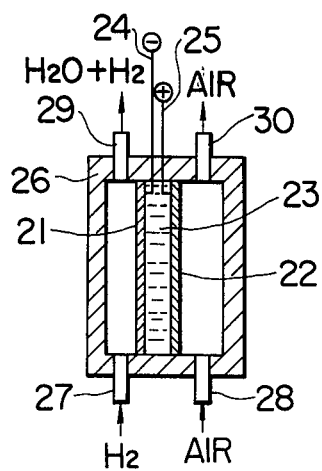

FIG. 4 shows a section of an embodiment of the structure of a hydrogen-air fuel cell. In FIG. 4, a porous hydrogen electrode 21 was fabricated as follows. 10 grams of active carbon powder was added to 1 gram of powder of $MoB_2$, and the powders were mixed well. Thereafter, a suspension of polytetrafluoroethylene was added to the mixture to form a pasty substance. The paste was applied onto a grid made of tantalum, and it was heated at 300° C. for 30 minutes. Thus, the hydrogen electrode was formed.

An air electrode 22 was formed by the same method as described in Example 1. As an electrolyte 23, an aqueous solution of phosphoric acid at a concentration of 5 mol/l was employed. Numerals 24 and 25 designate terminals of the hydrogen electrode and the air electrode respectively, numerals 27 and 28 designate inlets of hydrogen and air respectively, and numerals 29 and 30 designate outlets of exhaust hydrogen and exhaust air respectively.

The voltage of the hydrogen-air fuel cell at a temperature of 60° C. and a current density of 80 $mA/cm^2$ was 0.84 V, which was more excellent than a voltage of 0.75 V obtained under the same conditions by employing platinum as the catalyst.

EXAMPLE 4

5 ml of ion-exchanged water was added to 1 gram of powder of $Mo_2B_5$ under 300 mesh. While agitating well, 0.1 ml of a polytetrafluoroethylene suspension (content of polytetrafluoroethylene: 0.4 gr/ml) was dropped into the ion-exchanged water. Agitation was continued for 5 minutes after completion of the dropping, whereupon 100 ml of acetone was added. Then, a slimy sediment with $Mo_2B_5$ and polytetrafluoroethylene mixed therein was obtained. It was applied onto a tantalum-coated Ni wire net of 60 mesh at a density of about 20 mg/cm$^2$, and the resultant Ni wire net was pressed under 1 ton/cm$^2$. The net was heat-treated in N$_2$ at 230° C. for 1 hour. Thus, an electrode was obtained. The characteristic of this electrode at 50° C. was measured by the same method as in obtaining FIG. 3 in Example 1. Then, a favorable result of 0.24 V (potential versus a hydrogen reference electrode) was obtained as the single-electrode potential at a current density of 50 mA/cm$^2$.

Although the above examples have illustrated the cases of employing methanol and hydrogen as fuels, this invention is, of course, applicable to fuel cells employing other various fuels such as ethyl alcohol hitherto known. This invention, however, can produce the most favorable result in the case of using methanol or hydrogen as the fuel.

Although various acids can be employed as acidic electrolytes, phosphoric acid and sulfuric acid whose boiling points are high and which are not feared to generate any harmful gas are favorable.

What is claimed is:

1. In a fuel cell containing an acidic electrolyte and methanol as the fuel and having fuel and air electrodes, the improvement wherein said fuel electrode comprises an electrode catalyst for the fuel cell formed of at least one boride of molybdenum, whereby said boride of molybdenum acts as a catalyst to the electrolytic oxidation reaction of said methanol in said acidic electrolyte.

2. A fuel cell according to claim 1, wherein the boride of molybdenum is selected from the group consisting of Mo$_2$B, α-MoB, β-MoB, MoB$_2$ and Mo$_2$B$_3$.

3. A fuel cell according to claim 2, wherein the boride of molybdenum further includes Mo$_3$B$_2$ and/or MoB$_4$.

4. A fuel cell according to claim 1, 2 or 3, wherein said acidic electrolyte is sulfuric acid or phosphoric acid.

5. A fuel cell according to claim 1, wherein the fuel electrode comprises said at least one boride of molybdenum admixed with a carrier of activated carbon.

6. A fuel cell according to claim 1, wherein the fuel electrode comprises a porous molded compact of active carbon having a thin layer of at least one boride of molybdenum on the walls of the pores of said compact.

7. In a method of operating a fuel cell containing an acidic electrolyte and methanol as the fuel and having fuel and air electrodes, the improvement wherein the fuel electrode comprises an electrode catalyst for the fuel cell formed of at least one boride of molybdenum, whereby said boride of molybdenum acts as a catalyst to the electrolytic oxidation reaction of said methanol in said acidic electrolyte.

8. A method of operating a fuel cell according to claim 7, wherein the boride of molybdenum is selected from the group consisting of Mo$_2$B, α-MoB, β-MoB, MoB$_2$ and Mo$_2$B$_3$.

9. A method of operating a fuel cell according to claim 8, wherein the boride of molybdenum further includes Mo$_3$B$_2$ and/or MoB$_4$.

10. A method of operating a fuel cell according to claim 7, 8 or 9, wherein said acidic electrolyte is sulfuric acid or phosphoric acid.

* * * * *